United States Patent [19]

Stalin

[11] Patent Number: 5,090,885
[45] Date of Patent: Feb. 25, 1992

[54] PLUNGER TO SUPPORT A WALL ON PLASTICS FOAMING AND METHOD TO MAKE SUCH A PLUNGER

[75] Inventor: Ann C. Stalin, Stockholm, Sweden

[73] Assignee: Aktiebolaget Electrolux, Stockholm, Sweden

[21] Appl. No.: 619,734

[22] Filed: Nov. 29, 1990

[30] Foreign Application Priority Data

Feb. 15, 1990 [SE] Sweden ............................ 9000547

[51] Int. Cl.$^5$ ..................... B29C 33/40; B29C 39/10
[52] U.S. Cl. ................................. 425/117; 249/61; 249/65; 249/112; 264/220; 264/225; 264/511; 425/DIG. 12; 425/DIG. 44; 425/DIG. 112
[58] Field of Search .......... 425/DIG. 44, 4 R, 817 R, 425/1, DIG. 29, DIG. 12, DIG. 14, DIG. 112, 117; 249/113, 112, 134, 65, 61; 264/220, 225, 510, 511, 102

[56] References Cited

U.S. PATENT DOCUMENTS

| | | | |
|---|---|---|---|
| 3,001,582 | 9/1961 | Kindseth et al. | 249/113 |
| 3,035,310 | 5/1962 | Sokol et al. | 425/DIG. 29 |
| 3,888,617 | 6/1975 | Barnett | 425/296 |
| 3,950,477 | 4/1976 | DiGiacomo | 264/39 |
| 4,419,307 | 12/1983 | Kohara et al. | 425/DIG. 29 |
| 4,582,682 | 4/1986 | Betz et al. | 425/DIG. 44 |
| 4,751,032 | 6/1988 | Salamon et al. | 425/817 R |
| 4,769,188 | 9/1988 | Graham | 425/817 R |

FOREIGN PATENT DOCUMENTS 1256991 5/1960 France ..................... 425/DIG. 29

Primary Examiner—Jay H. Woo
Assistant Examiner—Khanh P. Nguyen
Attorney, Agent, or Firm—Pearne, Gordon, McCoy & Granger

[57] ABSTRACT

A plunger (10) for supporting a wall (46) of e.g. a refrigerator door against deformation from an expanding, and hardening foamed plastic (52) on the other side of the wall. An evacuated bag-formed part (18) filled with a particulate material (20), has a surface (42) showing an impression of the form of the wall (46). The plunger (10) is reshapable, so that it can serve as a plunger for walls (46) of different forms.

1 Claim, 1 Drawing Sheet

PLUNGER TO SUPPORT A WALL ON PLASTICS FOAMING AND METHOD TO MAKE SUCH A PLUNGER

BACKGROUND OF THE INVENTION

1. Field of the Invention

The invention refers to a plunger or mold form for supporting a preformed wall against deformation from expanding and hardening foamed plastic on the other side of the wall. The invention furthermore refers to a method for making such a plunger.

2. Description of the Related Art

In making a common type of refrigerator door having an outer wall of sheet metal and an inner wall of plastic, the walls are placed in a fixture, the space between the walls thereafter being filled with expanding and hardening plastic foam. The purpose of the fixture is to support the walls against the overpressure exerted by the foam before it has hardened and thereby prevent the walls from changing form. It is particularly important that the fixture supports all parts of the inner wall which are relatively weak and often have a very irregular form. For this purpose, this part of the fixture is constituted by a detachable plunger which accurately conforms to the inner wall, so that is shows a substantially complete impression of the inner wall, the plunger supporting the wall by said impression.

It can take 8 minutes for the foam to harden in the space between the walls. On multiple production of one refrigerator per minute, 8 fixtures with 8 identical plungers therefore might be needed. A manufacturer of refrigerator doors can make door types showing inner walls of e.g. 60 different forms. This requires $8 \times 60 = 480$ plungers. It is known to make such plungers of wood or metal having the drawback of being very expensive. Another drawback with the large number of plungers is that they take valuable space in the factory.

SUMMARY OF THE INVENTION

The object of the invention is to achieve a plunger of the kind introductorily set forth which requires a small labor effort to make and can be easily reshaped, so that it can be used as a plunger for walls of different forms, the number of plungers being necessary for a production thereby becoming substantially reduced.

This object is obtained by the plunger and by the method to make the plunger disclosed herein.

BRIEF DESCRIPTION OF THE DRAWINGS

An embodiment of the invention is described below in connection with the enclosed drawing, on which FIG. 1 in a sectional view showing a plunger before it has been formed

DESCRIPTION OF THE PREFERRED EMBODIMENT

Figure 1:
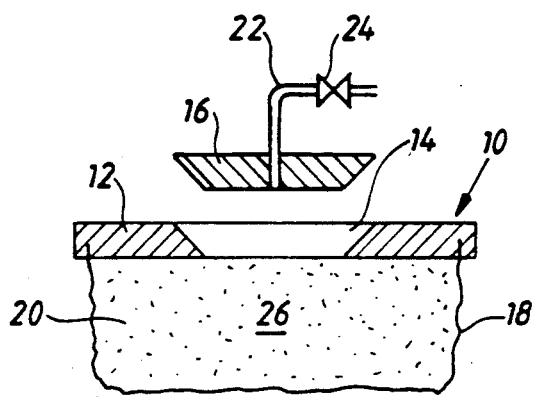

Referring to FIG. 1, there is shown a plunger 10 or mold form comprising a rigid plate 12 having an opening 14 which is coverable by a lid 16. A flexible bladder or bag-formed part 18 made of plastic film is fastened to the plate 12. Through the opening 14 the part 18 has been filled with a particulate material 20 in the shape of small plastic balls. A conduit 22 with a cut-off valve 24 is arranged in the lid 16. After the opening 14 has been covered by the lid 16, the air in the space 26 of the bag-formed part 18 is evacuatable through the conduit 22.

Referring to FIG. 1, 2, there is shown a master or original mold 30 having the form of an inner wall of a refrigerator door. The surface 32 of the mold has ducts 34 communicating with a space 36, which is evacuatable by a conduit 38.

Figure 3:
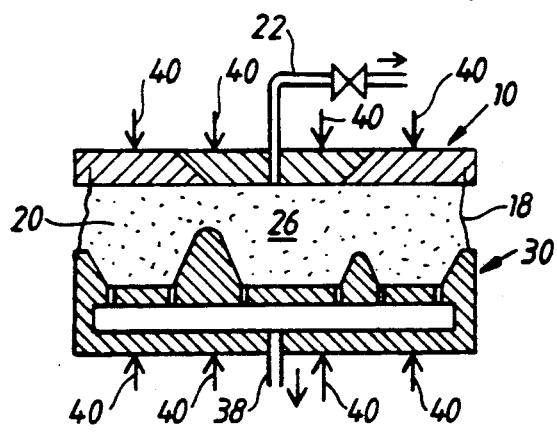
FIG. 3 shows how the plunger has been formed from the mold.

The plunger 10 is placed, see FIG. 3, with the bag-formed part 18 against the mold 30. Air is sucked out through the conduit 38, so that the part 18 is sucked against the surface 32 and takes its form. After that, the plunger 10 with the part 18 is pressed against the mold 30 by an outer force 40, so that the plastic balls cannot move relative to each other, simultaneously as the air in the space 26 is evacuated through the conduit 22.

Figure 4:
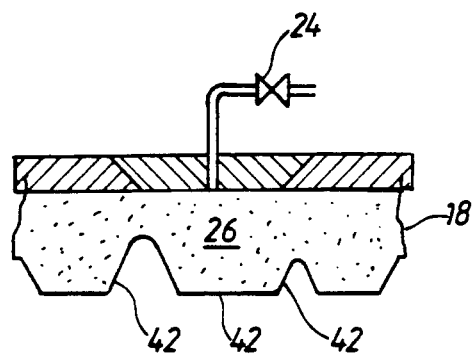
FIG. 4 shows the plunger after the forming.
Figure 2:
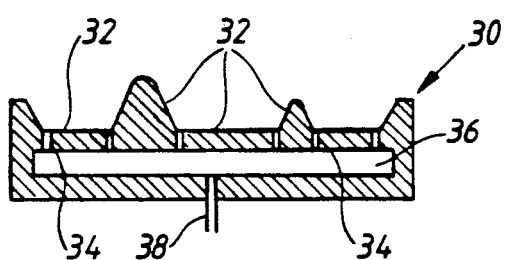
FIG. 2 shows a mold for forming the plunger.

In this way the plunger is made, which is shown in FIG. 4, where the bag-formed part 18 now constitutes a rigid body showing a precise impression 42 of the surface 32 of the mould 30. The vacuum in the space 26 is kept by the valve 24 being closed.

Figure 5:
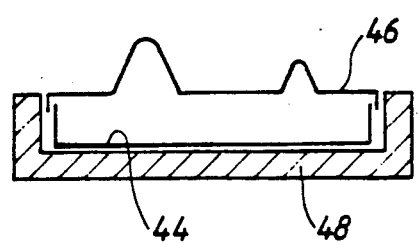
FIG. 5 shows a refrigerator door prepared to be filled with plastics foam and FIG. 6 shows the plunger supporting a wall of the door when the door has been filled with expanding and hardening foamed plastic.

In FIG. 5 is shown a refrigerator door constituted by an outer planar prefabricated wall 44 of sheet metal and an inner prefabricated wall 46 of thin rigid plastic. The walls 44 and 46 are kept fixed relative to each other in a fixture 48.

Figure 6:
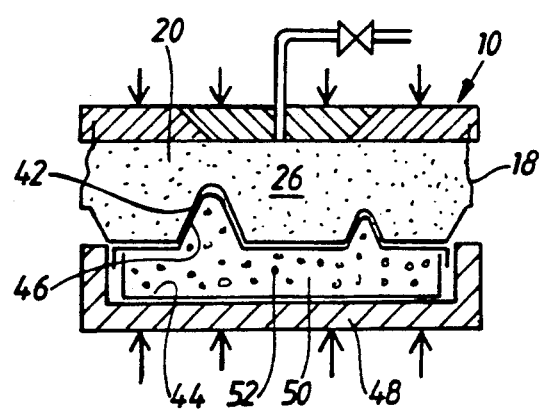

In FIG. 6, the plunger has been laid on the wall 46, so that the form of the wall 46 fits in with the corresponding form of the plunger. The fixture 48 and the plunger 10 are kept together, so that they cannot move from each other. After that, the space 50 between the walls 44 and 46 is filled with expanding and hardening foamed plastic 52, the plunger 10 supporting the wall 46 and preventing it from being deformed during the time the foam hardens.

By letting air into the the space 26, the plunger 10 can be made to retake the form shown in FIG. 1. The plunger can then be reshaped to match other walls having contours different from that of wall 46.

I claim:

1. A mold form comprising a flexible bladder having an interior filled with a particulate material and conduit means to provide communication between the interior of the bladder and an evacuation means, said conduit means including a valve means to selectively control communication between said evacuation means and said bladder interior, said valve means being movable from a vacuum blocking position to a vacuum communicating position, wherein prior to evacuation of the bladder, and with said valve means in the vacuum blocking position, the bladder and the particulate material freely conform to the contours of an original mold and thereafter, upon moving said valve means to said vacuum communicating position to evacuate the bladder, said bladder and particulate material accurately form a rigid inverted mold of the original mold, said inverted mold being maintained by returning said valve means to said vacuum blocking position, said inverted mold being reshapable into a different mold form after release of the vacuum.

* * * * *